United States Patent [19]

Rabinovich

[11] Patent Number: 4,747,316

[45] Date of Patent: May 31, 1988

[54] PROBE-GRIPPER

[75] Inventor: Joshua E. Rabinovich, Newton, Mass.

[73] Assignee: Millipore Corporation, Bedford, Mass.

[21] Appl. No.: 22,269

[22] Filed: Mar. 5, 1987

[51] Int. Cl.⁴ ............................................. G01N 35/00
[52] U.S. Cl. .................................. 73/864.73; 73/863; 73/863.01; 73/864.22
[58] Field of Search ................. 73/863, 863.01, 864.73, 73/864.15, 864.22

[56] References Cited

U.S. PATENT DOCUMENTS

| | | |
|---|---|---|
| 814,169 | 3/1906 | Sellenscheidt . |
| 1,195,516 | 8/1916 | Shields . |
| 2,741,381 | 4/1956 | Benzien ............................... 214/309 |
| 3,103,958 | 9/1963 | Rath ....................................... 141/96 |
| 3,285,299 | 11/1966 | Henry et al. ......................... 141/312 |
| 3,352,333 | 11/1967 | Glasgow et al. .................... 141/383 |
| 3,427,862 | 2/1969 | Hübner ......................... 73/864.73 X |
| 3,683,976 | 8/1972 | Remane .................................. 141/59 |
| 3,741,409 | 6/1973 | Painter ............................... 214/1 BC |
| 3,801,148 | 4/1974 | Rosgen ............................... 294/86 A |
| 3,945,486 | 3/1976 | Cooper .................................. 198/179 |
| 4,273,505 | 6/1981 | Clark et al. .......................... 414/735 |
| 4,586,390 | 5/1986 | Helke ............................... 73/864.73 |

Primary Examiner—Tom Noland
Attorney, Agent, or Firm—Hamilton, Brook, Smith & Reynolds

[57] ABSTRACT

A probe-gripper for automated sample preparation systems is disclosed, including a sample tube (12), an annular electrode (18), a barrel (40) surrounding the electrode, the barrel and the electrode being connected to a capacitance measurer, an annular elastomeric member (30) surrounding at least a portion of the electrode, the opposite end portions of the elastomeric member being secured to the electrode with an intermediate portion of the elastomeric member being free from the electrode to create an inflatable bladder, and passageways extending lengthwise of the probe to conduct pressurized fluid to the bladder to expand and contract it between gripping and release positions.

11 Claims, 2 Drawing Sheets

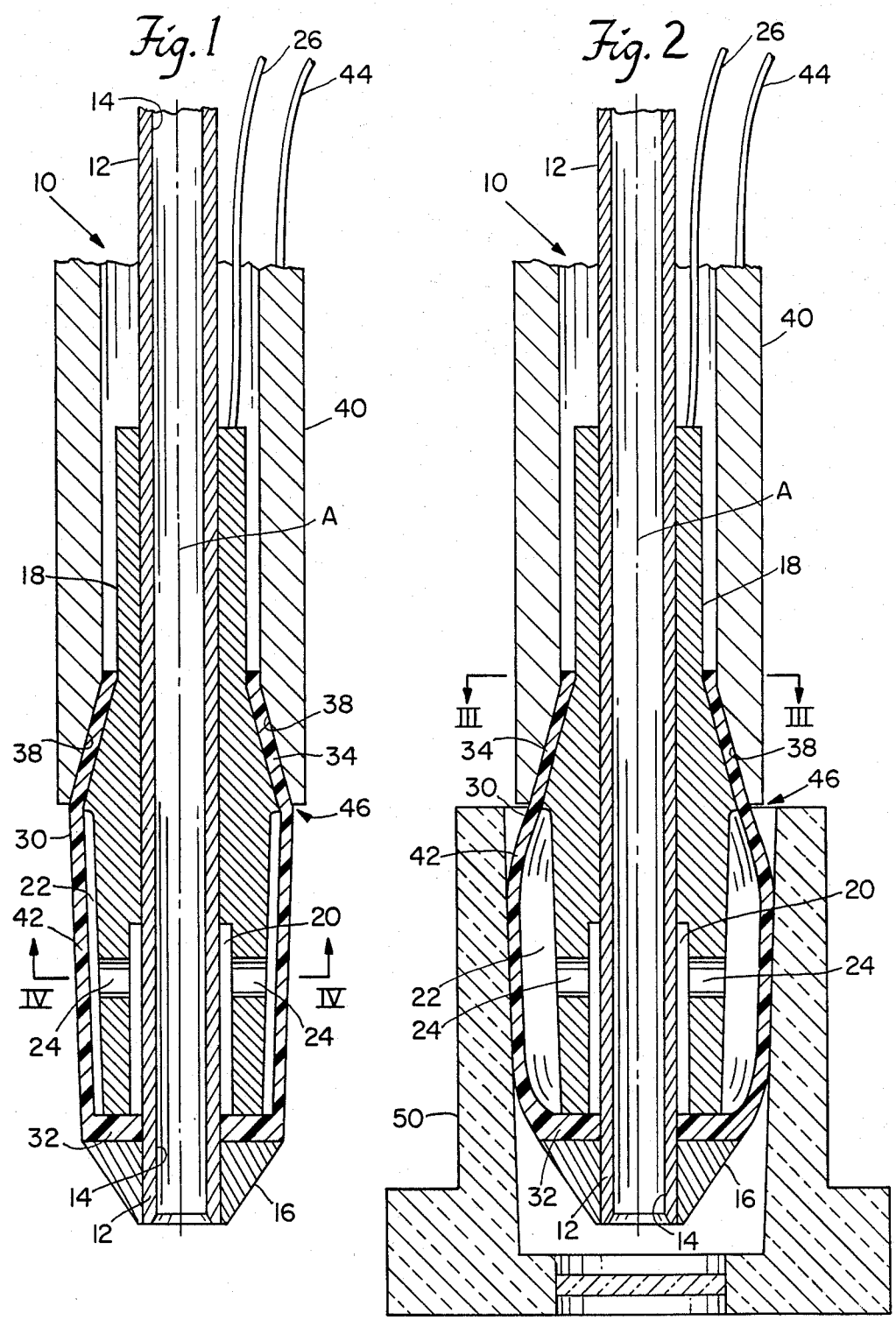

PROBE-GRIPPER

FIELD OF THE INVENTION

This invention relates generally to automated sample preparation systems, and more particularly to a probe-gripper for use with such systems.

BACKGROUND OF THE INVENTION

There are many systems used for automated sample preparation, which perform fluid handling operations. These systems involve the flow and movement of liquids, as well as solid phase elements, sample holding containers, test tubes, filters, and the like.

Some of these systems include conduits or probes through which fluid flows. They perform various operations such as, aspiration and dispensing of fluid and pipetting. The probes move both horizontally and vertically generally in x, y and z axes in a predetermined pattern. However, their functions have been limited to merely the handling of fluids.

Such probes, generally speaking, are incapable of moving hardware, such as test tubes, filters, and various solid phase elements. Thus, independent gripping devices having independent transport mechanisms, are required to move the hardware independently of the probe relative to the three axes.

It is specifically an object of this invention to provide a probe-gripper, which can perform all of the fluid handling functions that prior probes performed, plus the functions of handling and transporting the hardware involved in the sample preparations systems.

It is another object of this invention to provide a probe-gripper which has means for detecting whether or not it is in contact with fluid or a piece of hardware.

SUMMARY OF THE INVENTION

There is provided a probe-gripper for automated sample preparation systems which includes a sample tube which extends lengthwise of the probe through which fluid may flow alternatively in opposite directions. An annular electrode surrounds the sample tube adjacent one of its ends, which thus becomes the operating end of the tube. A barrel surrounds at least a portion of the electrode, and is spaced from the operating end of the tube. Each of the barrel and the electrode have means for connecting them to capacitance measuring instruments to detect changes in capacitance between these members, as for example, when the probe enters a test tube containing liquid or when it engages a filter or other pieces of hardware.

An annular, elastomeric member surrounds a portion of the electrode near the working end. The opposite end portions of the elastomeric member are secured to the electrode. One end is clamped to the electrode by the end of a tip on the sample tube. The other end is clamped between the electrode and the barrel. An intermediate annular portion of the elastomeric member is free from the electrode to create an inflatable bladder. There are means for conducting pressurized fluid lengthwise of the probe to the interior of the inflatable bladder to cause it to expand and contract into gripping and releasing positions respectively.

Pressurized fluid, such as air, is conducted lengthwise of the probe in channels located between the sample tube and the electrode to an internal plenum, which, in turn, communicates with an exterior plenum located at the annular exterior of the electrode in the area of the free intermediate annular portion of the elastomeric member.

The tube and the electrode are insulated, one from another, as are the exposed portions of the tube and the barrel which come in contact with liquids.

The probe, per se, is movable along x, y, and z axes by a robot, which in turn is controlled by a computer to perform the functions of aspiration and dispensing of fluids. The probe is moved to and from containers such as test tubes to perform functions of pipetting, flushing, and the like. Simultaneously its elastomeric member is expanded to grip the interior of test tubes, filters, and other hardware employed in sample preparation systems, and contracted to release them.

The above and other features of the invention, including various novel details of construction and combinations of parts, will now be more particularly described with reference to the accompanying drawings and pointed out in the claims. It will be understood that the particular probe-gripper embodying the invention, is shown by way of illustration only, and not as a limitation of the invention. The principles and features of this invention may be employed in varied and numerous embodiments without departing from the scope of the invention.

DESCRIPTION OF THE DRAWINGS

FIG. 1 is a sectional view of a probe-gripper embodying the features of the present invention.

FIG. 2 is a sectional view of the probe-gripper with its elastomeric member inflated to grip the interior of a filter.

DETAILED DESCRIPTION OF THE INVENTION

Figure 3:
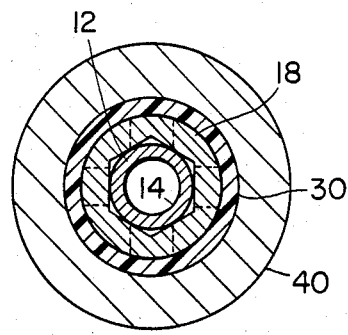
FIG. 3 is a section taken on the lines III III on FIG. 2.

A probe-gripper generally designated, 10, is shown in the drawings on a scale which is approximately 10 times larger than an actual probe-gripper made in accordance with the invention, it being understood that the probe-gripper is small enough to enter the open end of a conventional laboratory test tube. The probe-gripper includes a sample tube 12, extending lengthwise of the probe, and includes a central passageway 14, through which fluid may flow alternatively in opposite directions. Stainless steel has been found satisfactory for the tube. The sample tube includes a frustoconical nose 16, at one end, which may be either formed integral with the tube, or made separately and assembled on the tube, as for example, by the use of silver solder.

An annular electrode 18, surrounds the lower end of the tube 12, adjacent the nose 16. The electrode is made of brass and includes an internal cylindrical plenum 20, which communicates with an external frustoconical plenum 22, by way of four passageways 24. A wire 26, connects the electrode to capacitance measuring means, which may be part of the computer and not shown.

Figure 4:
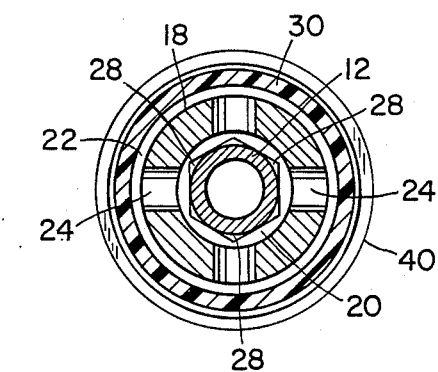
FIG. 4 is a section taken on lines IV IV on FIG. 1.

As will be seen in FIGS. 3 and 4, the outer diameter of the tube 12, is cylindrical and the inner diameter of the electrode 18, is hexigonal. It may also assume any other polygonal shape. Thus, when the electrode is assembled over the tube, there are 6, generally triangular passageways 28 running parallel with the axis A of the tube 12 to permit pressurized fluid to flow to the interior plenum 20, through the passageways 24, to the exterior plenum 22. The inner diameter of the electrode 18, and the outer diameter of the tube 12, are insulated from each other by a nonconductive coating, as for example, teflon.

An annular, elastomeric member in the form of a sheath 30, surrounds the plenum 22, and includes a generally flat, bottom portion 32, which is clamped between the electrode 18, and the nose 16 of the tube 12. An upper, generally frustoconical portion 34, is secured to the electrode 18, being clamped to a conical surface 36, by a conical portion 38, of a barrel 40, which surrounds the upper portion of the electrode 18, and consequently, the tube 12. The intermediate portion 42 of the elastomeric sheath surrounds the external plenum 22.

The barrel 40, is made of stainless steel and is connected to ground by a conductor 44. The capacitance measuring means in the computer, detects changes in capacitance below the electrode 18 and the barrel 40 incurring generally in the area designated area 46. For example, when the probe is at rest, in other words, not dipped in liquid or not engaging a piece of hardware, the capacitance of the area 46, would be determined by the dielectric value of the elastomeric member 30, and the surrounding air. This could be designated the zero point by the computer controlling the operation of the robot manipulated probe 10. However, when the probe is caused to enter a test tube or other vessel containing a fluid, dielectric value of the fluid would cause the capacitance between the electrode 18, and the sheath 40, to change, telling the computer that the probe had entered the fluid. In like manner, when the probe comes close to or enters a piece of hardware, as for example, a filter 50, illustrated in FIG. 2, the capacitance would change to another value thereby indicating that the probe had done its work.

Referring now to FIG. 2, the probe is shown inserted in the filter 50 with its elastomeric sheath engaging the interior wall 52 of the filter 50. The wall 52 is representative of a luer connector, or for that matter, the inner diameter of a test tube. When the probe has entered the open mouth of the filter 50, pressurized air is caused to flow through the six passageways in the electrode 18 that surround the outer diameter of the tube 12, to the inner cylindrical plenum 20, through the radial passageways 24, to the exterior plenum 22, pressurizing it and causing the elastomeric sheath to bulge outwardly gripping the interior of the filter or other object it is intended to engage. Thereafter, the computer causes the robot to raise the gripper-probe 10 and to move it to any desired location. The filter, if it is to be discarded, will drop from the gripper-probe when the plenum 22 is depressurized and the elastomeric sheath returns to its original position.

It will be obvious that the probe-gripper is capable of many additional functions, as for example, to simultaneously energize a secondary gripping device through the sample tube 12 in order to transport test tubes or any other hardware.

I claim:

1. A probe-gripper for automated sample preparation systems comprising:
   a. a sample tube extending lengthwise of the probe through which fluid may flow, alternatively, in opposite directions,
   b. an annular electrode surrounding the sample tube adjacent one of its ends,
   c. a barrel surrounding at least a portion of the electrode,
   d. means for connecting the barrel and the electrode to capacitance measuring means to detect changes in capacitance between them,
   e. an annular, elastomeric member surrounding at least a portion of the electrode,
   f. opposite end portions of the annular, elastomeric member being secured to the electrode,
   g. an intermediate annular portion of the elastomeric member being free from the electrode to create an inflatable bladder, and,
   h. means for conducting pressurized fluid lengthwise of the probe to the interior of the inflatable bladder to cause it to expand and contract into gripping and releasing positions respectively.

2. A probe-gripper according to claim 1 wherein, the electrode is brass and the barrel is steel.

3. A probe-gripper according to claim 1 wherein, the tube is insulated from the electrode.

4. A probe-gripper according to claim 1 wherein, the interior of the electrode is polygonal in cross section and the exterior of the tube is circular in cross section, the electrode and tube creating between them fluid passageways to create between them the means to conduct pressurized fluid to the bladder.

5. A probe-gripper for automated sample preparation systems comprising:
   a. a sample tube extending lengthwise of the probe through which fluid may flow, alternatively, in opposite directions,
   b. an annular metalic electrode surrounding the sample tube adjacent one of its ends,
   c. a metalic barrel surrounding at least a portion of the electrode,
   d. means for connecting the barrel and the electrode to capacitance measuring means to detect changes in capacitance between them,
   e. an annular, elastomeric member surrounding at least a portion of the electrode,
   f. one end portion of the annular, elastomeric member being clamped between the electrode and the barrel, the opposite end portion of the annular elastomeric member being clamped between the electrode and an end portion of the tube,
   g. an intermediate annular portion of the elastomeric member being free from the electrode, the sleeve, and the tube to create an inflatable bladder,
   h. means for conducting pressurized fluid lengthwise of the probe to the interior of the inflatable bladder to cause it to expand and contract into gripping and releasing positions respectively.

6. A probe-gripper according to claim 5 wherein, the electrode is brass and the barrel is steel.

7. A probe-gripper according to claim 5 wherein, the tube is insulated from the electrode.

8. A probe-gripper according to claim 5 wherein, the interior of the electrode is polygonal in cross section and the exterior of the tube is circular in cross section, the electrode and tube creating between them fluid passageways to create between them the means to conduct pressurized fluid to the bladder.

9. A probe-gripper for automated sample preparation systems comprising:
   a. an elongate sample tube, extending lengthwise of the probe through which fluid may flow alternatively in opposite directions,
   b. an annular electrode surrounding the sample tube adjacent one end, c. a barrel surrounding at least a portion of the electrode, d. means for connecting the barrel and the electrode to capacitance measuring means to detect changes in capacitance between them, e. an annular elastomeric member surrounding at least a portion of the electrode, f. opposite end portions of the annular electrode member being secured to the electrode, g. an intermediate annular portion of the elastomeric member being free from the electrode to create an inflatable bladder, and, h. at least one fluid passageway extending between the tube and the electrode and communicating with a plenum between the electrode and the interior of the inflatable bladder to cause the bladder to expand and contract when pressurized fluid is caused to enter the fluid passageway.

10. A probe-gripper according to claim 9 wherein, the electrode is brass and the barrel is steel.

11. A probe-gripper according to claim 9 wherein, the tube is insulated from the electrode.

* * * * *